US 12,065,389 B2

(12) United States Patent
Franzrahe et al.

(10) Patent No.: US 12,065,389 B2
(45) Date of Patent: Aug. 20, 2024

(54) FLUID-BED GRANULATOR SYSTEM WITH COATING MATERIAL TO PREVENT DUST BUILDUP IN THE AIR SYSTEMS OF UREA GRANULATION PLANTS

(71) Applicants: THYSSENKRUPP FERTILIZER TECHNOLOGY GMBH, Dortmund (DE); thyssenkrupp AG, Essen (DE)

(72) Inventors: Harald Franzrahe, Dortmund (DE); Matthias Potthoff, Dortmund (DE); Andreas Grulke, Essen (DE)

(73) Assignees: THYSSENKRUPP FERTILIZER TECHNOLOGY GMBH, Dortmund (DE); thyssenkrupp AG, Essen (DE)

( * ) Notice: Subject to any disclaimer, the term of this patent is extended or adjusted under 35 U.S.C. 154(b) by 912 days.

(21) Appl. No.: 16/981,740

(22) PCT Filed: Mar. 21, 2019

(86) PCT No.: PCT/EP2019/057111
§ 371 (c)(1),
(2) Date: Sep. 17, 2020

(87) PCT Pub. No.: WO2019/180155
PCT Pub. Date: Sep. 26, 2019

(65) Prior Publication Data
US 2021/0114948 A1 Apr. 22, 2021

(30) Foreign Application Priority Data

Mar. 23, 2018 (EP) .................................. 18163504
Jun. 4, 2018 (EP) .................................. 18175723

(51) Int. Cl.
*B01J 2/16* (2006.01)
*C05C 9/00* (2006.01)
*C05G 5/12* (2020.01)

(52) U.S. Cl.
CPC ................. *C05C 9/005* (2013.01); *B01J 2/16* (2013.01); *C05G 5/12* (2020.02)

(58) Field of Classification Search
CPC ........................................................ B01J 2/16
See application file for complete search history.

(56) References Cited

U.S. PATENT DOCUMENTS 3,378,240 A * 4/1968 Kinney .................. C21B 7/002
 261/115
3,853,506 A * 12/1974 Pircon ..................... B01J 19/22
 95/218

(Continued)

FOREIGN PATENT DOCUMENTS

DE 118287 A 2/1976
DE 31 16 778 A 2/1982

(Continued)

OTHER PUBLICATIONS

International Search Report issued in PCT/EP2019/057111, dated May 17, 2019.

*Primary Examiner* — Timothy Kennedy
(74) *Attorney, Agent, or Firm* — thyssenkrupp North America, LLC

(57) ABSTRACT

A fluid-bed granulator system may include a fluid-bed granulator, a scrubber unit, and a connection-duct between an air vent opening of the fluid-bed granulator and the scrubber unit. An inner surface of the connection-duct may be at least partially coated with an anti-adhesion layer. The system may further include a granulator space inside the fluid-bed granulator, a perforated plate disposed inside the granulator space, spray nozzles disposed at the perforated plate, a fluidization air inlet, supply lines for atomization air connected to the spray nozzles, supply lines for a liquid melt connected to the spray nozzles, a granulation seeds inlet, a granulator outlet opening, and an air vent opening. A dis- (Continued)

closed urea granulation plant may utilize the fluid-bed granulator system.

12 Claims, 2 Drawing Sheets

(56) References Cited

U.S. PATENT DOCUMENTS

| | | |
|---|---|---|
| 4,219,589 A | 8/1980 | Rafael |
| 4,330,319 A | 5/1982 | Bexton |
| 4,701,353 A | 10/1987 | Mutsers |
| 4,740,390 A | 4/1988 | Kuelling |
| 6,179,893 B1 | 1/2001 | Bendix et al. |

FOREIGN PATENT DOCUMENTS

| | | |
|---|---|---|
| EP | 0 177 998 A | 4/1986 |
| EP | 1 938 780 A | 7/2008 |
| EP | 2 832 439 A | 2/2015 |
| GB | 1395906 A | 5/1975 |
| JP | 09-024267 A | 1/1997 |
| JP | H10-156166 A | 6/1998 |
| JP | H10-166122 A | 6/1998 |
| JP | 2000-044371 A | 2/2000 |
| JP | 3456355 B | 10/2003 |
| JP | 2009-106862 A | 5/2009 |
| JP | 50099858 A | 4/2012 |
| JP | 2012509833 A | 4/2012 |
| WO | 2005/032696 A | 4/2005 |
| WO | 2010060535 A | 6/2010 |
| WO | 2014/094987 A | 6/2014 |
| WO | 2015/072854 A | 5/2015 |

* cited by examiner

FLUID-BED GRANULATOR SYSTEM WITH COATING MATERIAL TO PREVENT DUST BUILDUP IN THE AIR SYSTEMS OF UREA GRANULATION PLANTS

CROSS REFERENCE TO RELATED APPLICATIONS

This application is a U.S. National Stage Entry of International Patent Application Serial Number PCT/EP2019/057111, filed Mar. 21, 2019, which claims priority to European Patent Application No. EP 18175723.8, filed Jun. 4, 2018, and European Patent Application No. EP 18163504.6, filed Mar. 23, 2018, the entire contents of all of which are incorporated herein by reference.

FIELD

The present disclosure generally relates to fluid-bed granulators with coated vent ducts and to plants including such granulators.

BACKGROUND

Due to a continuous world population growth, there is an ongoing need in providing reliable, easy producible and cheap fertilizers. These conventional fertilizers may contain nitrogen, phosphate, sulfur, potassium or micronutrients.

A common, widely used fertilizer contains urea as its main component. The water soluble urea rapidly decomposes in the soil, providing ammonia and nitrate compounds. Based on the application, the fertilizer may contain only urea or a combination of urea with one or more of the before mentioned components, e.g. phosphate, sulfur, potassium or micronutrients.

Urea can be produced on a large industrial scale by reacting ammonia with carbon dioxide via a (simplified) two-step reaction:

$$2NH_3 + CO_2 \rightleftharpoons H_2N-COONH_4 \quad (1)$$

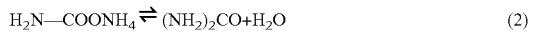

$$H_2N-COONH_4 \rightleftharpoons (NH_2)_2CO + H_2O \quad (2)$$

Solid urea particles, as required for fertilizer applications, are produced in a finishing section e.g. by granulation, prilling or crystallization. The absorbance of water due to the hygroscopic nature of urea easily results in uncontrolled aggregation, quality degradation and caking of fine, untreated urea particles. This process can negatively affect the solubility, bulk storage, durability or chemical stability of the urea fertilizer. In addition, the uncontrolled gain in weight by absorbing water increases the transport weight and costs. Therefore, further post synthesis process steps are necessary in order to provide a transportable and storable urea fertilizer. Common technical processes include diverse solidification processes like prilling, drum granulation or fluid-bed granulation. Especially the prilling processes suffer from some critical drawbacks like relatively soft particles and sometimes deformed inhomogeneous particles.

These problems can be avoided by using a fluid-bed granulation process, which results in harder, more stable and homogeneous granules. The resulting granular urea is particularly suitable for bulk transportation and blending operations. Furthermore, there is reduced segregation or mechanical damage during mixing and transporting of the urea based fertilizer.

Examples of fluid-bed granulation process of urea can be found in WO 2010/060535 A1, e.g. in paragraphs [0025]-[0035], FIG. 1 or in U.S. Pat. No. 4,701,353 A, DE 31 16 778 A1 and U.S. Pat. No. 4,219,589 A.

Urea fertilizers can be combined with ammonium sulfate or elemental sulfur, therefore providing both plant nutrients nitrogen and sulfur in one fertilizer. Ammonia sulfur can be directly used by the plant, whereas elemental sulfur needs to be decomposed by soil microorganisms, thereby providing long-term plant nutrients. Examples of urea/sulfur granules can be found e.g. in U.S. Pat. No. 4,330,319 A.

The fluid-bed granulation process is based on providing granulation seeds, which grow by absorbing very small droplets of a growth liquid. These small droplets can be provided via an "atomized" liquid urea melt. The term "atomized" used in the description refers to a mixing process of the liquid urea melt (or other suitable fertilizer melts) with a pressurized medium like air. This mixing process creates a liquid/gas emulsion or an aerosol of small droplets. The term "atomized" should therefore not be confused with a molecular separating process of atomic/covalent bonds. The produced droplets may have a medium size distribution around 1 μm to 200 μm. These small melt droplets are absorbed on the surface of the granulation seeds, thereby creating "growing" granulation particles. These fresh "in-situ" produced granules may commonly exhibit temperatures over 100° C. and are relatively soft. The particles further cool down in the fluid-bed of the granulator and/or in separate cooling compartments.

However, the in-situ produced warm particles show a significant adhesion/wetting affinity. This adhesion may result in the before mentioned caking or even a (partiality) adsorption of urea granules on the granulator walls. This adsorption process of granules may even lead to a partial or total blocking of the fluid-bed granulator walls, vent openings and ducts. This blocking requires extensive cleaning measures or even complete shutdowns of the fluid-bed granulator.

GB 1,395,906 A discloses a prilling unit with a non-wetting coating. The coating may be located at the nozzles and distributor plates.

DD 118 287 discloses reactor wall coatings suitable for the polymerization of vinyl polymers.

EP 2 832 439 A1 discloses a reactor for producing nitrogen-containing fertilizer granules, wherein the inside walls of said reactor are extensively coated with a layer of at least one organic silicon compound.

Thus a need exists for a fluid-bed granulation or fluid-bed cooling system with a decreased anti-wetting or anti-caking tendency without the necessity of a complete granulator coating.

DETAILED DESCRIPTION

Figure 1:
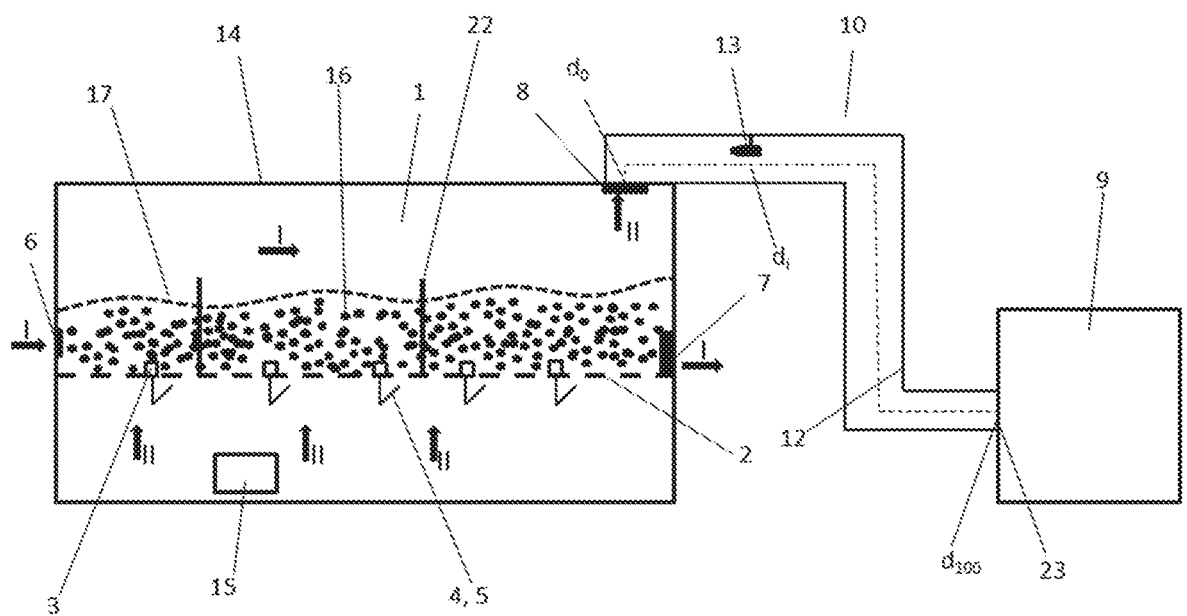
FIG. 1 is a diagram of a fluid-bed granulator system according to the prior art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a fluid-bed granulator with a coated vent duct, to a plant comprising a fluid-bed granulator with a coated vent duct, and to the use of the fluid-bed granulator for the production of fertilizer granules.

The fluid-bed granulator system comprises a fluid-bed granulator with an air vent opening. Dust, e.g. urea dust, and chemical vapors like ammonia, which are created or released during the granulation process, are removed in a scrubber unit. Preferably, the scrubber unit comprises at least a dust removing scrubber and an ammonia removing scrubber. Examples of suitable scrubbers can be found in WO 2005/032696 A1 (FIG. 1) or WO2010/060535 A1. A connection-duct is located between the air vent opening of the fluid-bed granulator and the scrubber unit. This connection-duct transfers the before mentioned dust (e.g. urea dust), vapors and gases to the scrubber unit. The inner surface of the connection-duct is at least partially coated with an anti-adhesion layer, preferably comprising an (or more) organic silicon compound(s) or fluorinated organic compounds, e.g. polytetrafluorethylene. Preferably, the term "partially coating" relates to a coating covering at least 5% respective 10% of the inner connection surface, more preferably at least 30%. The anti-adhesion layer decreases the adhesion affinity of the granulation dust within the connection-duct. Preferably the connection-duct is coated starting from the air vent opening to the first connection-duct bending (preferably approximately 90 degree angle shape). The first connection-duct bending results in a change of the flow direction based on the bending angle. Preferably, the bending angle is the range of between plus/minus 10 degree to 170 degree, more preferably in the range from plus/minus 30 degree to 120 degree.

Preferably the fluid-bed granulator comprises at least a granulator space inside the fluid-bed granulator. The fluid-bed granulator further comprises a perforated plate located inside the granulator space and spray nozzles located in, on, above or beside the perforated plate. Preferably, the spray nozzles are attached to the perforated plate. A fluidization air inlet, preferably located below the perforated plate, provides the necessary fluidization air for the fluid bed of fertilizer granules. The term "fluidization air" includes air or inert gases like carbon dioxide ($CO_2$), nitrogen, argon or mixtures thereof. The spray nozzles are connected with supply lines for atomization air and supply lines for a liquid melt, preferably a liquid melt containing urea. Optionally, these supply lines for air and melt can be combined in one line. In addition, the fluid-bed granulator comprises a granulation seeds inlet. The term "a granulation seeds inlet" comprises internal and external devices, lines and openings for the introduction of granular seeds. The term "internal" refers to the production of granular seeds within the granulator. The term "external" refers to the provision or production of granular seeds from outside the granulator, e.g. via sieves or crushers outside the fluid-bed granulator. Furthermore the fluid-bed granulator comprises a granulator outlet opening and the air vent opening. The position of the air-vent opening is not fixed within the fluid-bed granulator. Preferably the air-vent opening is placed next to and/or above the granulation seeds inlet. Optionally, the granulator space comprises separating walls, optionally with integrated openings. These separating walls may further alter and modify the speed of the fluid bed towards the granulator outlet opening.

Preferably, the anti-adhesion layer comprises an organic silicon compound. These silicon compounds effectively reduce the dust adhesion in the connection-duct and prevent/reduce the build-up of obstructing solid matter in the connection-duct. Examples of suitable coating procedures with organic silicon compounds, e.g. based on methylpolysiloxane, can be found in EP 2 832 439 A1, paragraphs [0018]-[0025] and [0030].

According to a preferred embodiment, at least 10%, preferably at least 30%, more preferably at least 50%, of the inner surface of the connection-duct is coated with the anti-adhesion layer.

In a further embodiment of the fluid-bed granulator a cleaning nozzle, preferably 1 to 6 cleaning nozzles, is/are located inside the connection-duct. The cleaning nozzle comprises nozzles types suitable for spraying water, providing additional cleaning means in the connection-duct. Optionally, more than one cleaning nozzle is located inside the connection-duct. Preferably the cleaning nozzles are arranged alongside the air flow direction and/or orthogonal to the air flow. Furthermore, the cleaning nozzles enable a suitable cooling of the dust and gas streams inside the connection-duct, thereby reducing the temperature of the gas/dust in the connection-duct and the scrubber unit.

Preferably, the cleaning nozzle is located at a place/space within 2% to 90%, preferably between 5% to 50%, of the in-duct distance between the air vent opening and the scrubber unit inside the connection-duct. The term "in-duct distance" refers to the distance within the connection-duct measured from the air vent opening to the scrubber unit. Thereby, the relative value "0%" refers directly to the air vent opening. The relative value "100%" refers to the complete (before mentioned) in-duct distance, ending at the scrubber unit inlet. Thereby, $d_0$ defines a starting point at the vent opening and $d_{100}$ defines an end point at scrubber opening. Therefore, a relative in-duct position, e.g. of the cleaning nozzles, within the inner space of the connection-duct is preferably indicated as $d_i$.

Surprisingly, the inventive coating enables a far more remote placement, indicated as $d_i$ and referring to the vent opening of the cleaning nozzle in the connection-duct. This remote placement within a space of between 2% ($d_2$) to 90% ($d_{90}$) in-duct distance prohibits a reflux of cleaning liquids from a cleaning nozzle to the fluid granulator, more preferably in a vertical section of the connection-duct, thereby effectively preventing any reflux into the granulator space. This before mentioned reflux of cleaning liquids into the fluid-bed granulator would otherwise occur if the cleaning nozzles would be placed near the vent-opening of the connection-duct. On the other hand, a non-coated connection-duct requires cleaning means, e.g. a cleaning nozzle, located near the vent opening, outside the before mentioned space of between 2% ($d_{10}$) to 90% ($d_{90}$) of the in-duct distance, in order to remove a urea dust adhesion and avoid a complete connection-duct blocking.

According to a preferred embodiment, the cleaning nozzle is located in a vertical section or horizontal section the of connection-duct, thereby prohibiting a reflux of the cleaning liquid into the granulator space. Preferably, the term "vertical" refers to the granular flow direction, describing a section of the connection-duct arranged approximately (preferably within a deviation of plus/minus 15 degree) orthogonal to the granular flow direction. Preferably the term "horizontal" to the granular flow direction, describing a section of the connection-duct arranged approximately (preferably within a deviation of plus/minus 15 degree) with the granular flow direction.

In a preferred embodiment, the organic silicon compound comprises polyalkylsilicone compounds, polyarylsilicone compounds, polyallylsilicone compounds and/or mixtures or derivatives of alkyl-, aryl- and allyl silicone compounds.

Preferably, the organic silicon compound comprises polyalkylsiloxane, polymethylsiloxane, polydimethylsiloxane, polymethylphenylsiloxane, (poly-)perfluoroalkylsilane or (poly-)perfluoroalkylsiloxane and/or mixtures or derivatives thereof, more preferably the organic silicon compound comprises polymethylsiloxane.

In a further preferred embodiment, the anti-adhesion layer, preferably comprising an organic silicon compound, has a thickness of 0.5 μm to 1000 μm, preferably 15 μm to 40 μm.

Preferably, the scrubber unit comprises a dust removing scrubber and an ammonia removing scrubber. Examples of suitable scrubbers can be found in WO 2005/032696 A1 (FIG. 1), WO 2010/060535 A1 (FIG. 1, paragraphs [0025] to [0030]), WO 2015/072854 A1 or EP 0 177 998 A1. In a preferred embodiment, the dust scrubber utilizes a dilute urea solution to remove dust, small urea or other product particles. Very small particles like aerosols can be optionally removed according to WO2014/094987 A1, e.g. paragraphs [0025], and FIG. 2.

In a preferred embodiment, the perforated plate is at least partially coated with the anti-adhesion layer, preferably comprising an organic silicon compound. By combining the coated inventive vent-duct and a coated perforated plate, the overall caking tendency in fluid-bed granulator is further decreased.

The invention further comprises an inventive fluid-bed granulator system as previously disclosed for the production of fertilizer granules containing ammonia compounds, nitrates, phosphates, urea, elemental sulfur, ammonia sulfate, UAS (urea-ammonia sulfate), and/or mixtures thereof.

The invention is further described in the following example. The example is meant for illustrative purpose only and does not restrict the scope of protection.

1$^{st}$ Example

Metallic granulator wall plates (size DIN A4) were coated (one half of the plate) with one of three different coatings based on silicon dioxide ($SiO_2$), perfluoralkylsilane and polymethylsiloxan. The coated metallic granulator wall plates were placed inside a running fluid-bed granulator producing urea granules for 19, 20 and 17 day respectively. Afterwards, the metallic plates were optically inspected by comparing the coated and non-coated parts of the metallic plates. The averaged results are summarized in table 1 below. A weak or no urea adhesion is indicated with (++), a medium adhesion of urea is indicated with (◯) and a strong adhesion is indicated with (−).

TABLE 1

| degree of urea adhesion | |
|---|---|
| coating | degree of urea adhesion |
| silicon dioxide | ◯ |
| perfluoroalkylsilane | − |
| polymethylsiloxane | ++ |

As shown in table 1, a polymethylsiloxane coating effectively prevents the adhesion of urea granules on the inspected surface. As mentioned before, this effect enables a relocation of the cleaning nozzle within the connection-duct from the vent-opening to the space of 2% to 90% of the in-duct distance between the air vent opening and the scrubber unit.

2$^{nd}$ Example

The connection-duct of a fluid-bed granulator (as basically described in FIGS. 1 and 2) was coated with an anti-adhesion layer according to the invention. The connection-duct was coated starting from the air vent opening to the first connection-duct bending (approximately 90° (degree) change of the flow direction, preferably within a range of 70 degree to 120 degree). The overall testing period was one year. During this time span no falling dust lumps were detected. Without a coating according to the invention, falling dust lumps were detected during the year, especially after an extended running time. These falling dust lumps can result in damages in the fluid-bed granulator, especially falling dust lumps may damage the perforated plate.

| Days | Without coating | Coated connection duct |
|---|---|---|
| 33 | ++(1) | + |
| 45 | ++(1) | + |

(++ strong urea dust accumulation/+ weaker urea dust accumulation; measured by optical inspection, (1) estimated based on dust accumulation after 53 days)

An anti-adhesive coating according to the invention significantly lowers the numbers of fluid-bed granulator shut-downs. These shut-downs require a production stop and a complicated clean up of the connection-duct. Contrary to previous experiences, it is not necessary to coat the whole inner space of the fluid-bed granulator as described in e.g. EP 2 832 439 A1. On the other hand, an anti-adhesive coating according to the present invention alone is sufficient to significantly reduce the appearance of falling dust lumps and the number of fluid-bed granulator shut-downs. Therefore the invention at hand significantly reduces the coating cost (whole space versus selected single space) of the anti-adhesive coating and the overall amount of (precursor) coating chemicals in comparison to the state of the art.

FIG. 1 shows a fluid-bed granulator system according to the state of the art comprising a fluid-bed granulator (14) with a granulator space (1) inside the fluid-bed granulator (14) and a perforated plate (2) located inside the granulator space (1). Spray nozzles (3) are located on or above the perforated plate (2), a fluidization air inlet (15) is located below the perforated plate (2). Multiple supply lines for atomization air (4) and supply lines for a liquid melt (5) are connected to the spray nozzles (3). The granulator further comprises a granulation seeds inlet (6), preferably in connection with a not shown product sieve or crusher, a granulator outlet opening (7) and an air vent opening (8). The fluid-bed (17) is formed by the corresponding granular particles (16) utilizing the fluidization air from below the perforated plate (2). The fluidization air flow is indicated by arrows labeled (II), the flow direction of the fluid bed granular particles (16) is indicated by arrows labeled (I). The fluid-bed (17) is preferably divided by one or more separating walls (22). The fluid-bed granulator system further comprises a scrubber unit (9) and a connection-duct (10) between the air vent opening (8) and the scrubber unit (9). Preferably, the scrubber unit (9) comprises at least one (not shown) dust scrubber and one ammonia scrubber (not shown). A connection-duct (10) connects the fluid-bed granulator (14) with the scrubber unit (9) via the vent opening (8) and the scrubber opening (23). A cleaning nozzle (13) is located near the vent opening (8) at ($d_i$), prohibiting the adhesion, caking and blocking of the inner connection-duct (10) by urea dust in this area by spraying water in the direction of the air vent opening (8). However, part of the water and urea dust clusters may drop into the fluid-bed (17). This may disturb the homogeneous particle grow and air flow. The water flow will lead to large scale agglomeration inside the fluid-bed granulator, thereby obstructing proper operation of the fluid bed-granulator.

Figure 2:
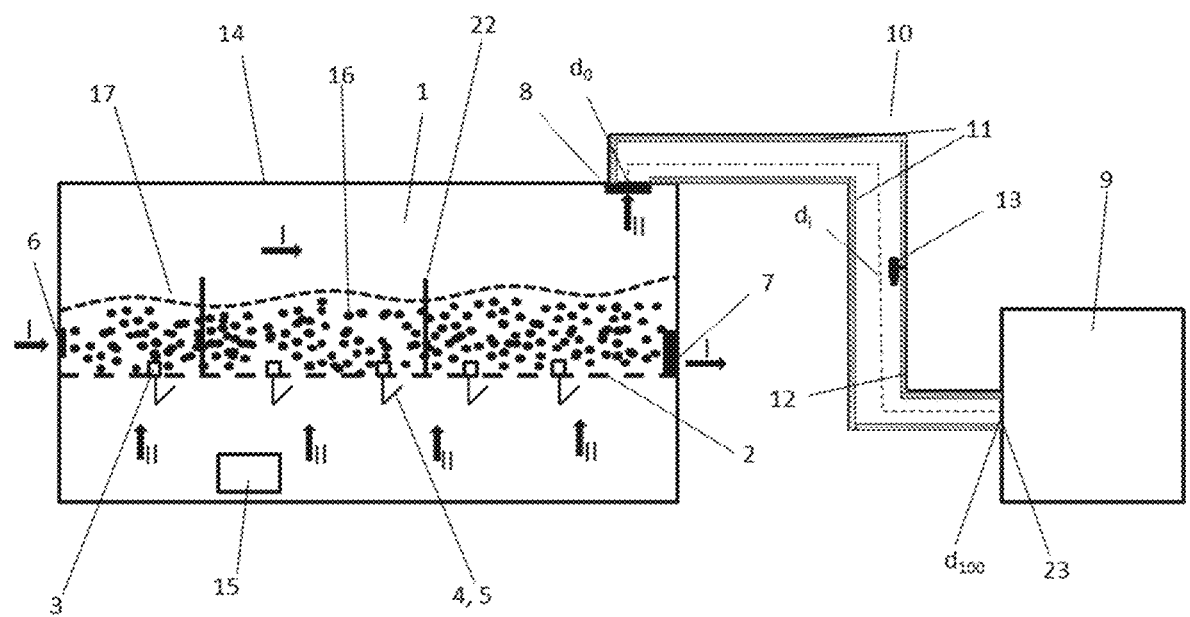
FIG. 2 is a diagram of an example fluid-bed granulator system of the present disclosure.

FIG. 2 shows a fluid-bed granulator system according to the invention. The principal setup is identical with the fluid-bed granulator system setup described in FIG. 1. However the inner surface of the connection-duct (10) is at least partially coated with an anti-adhesion layer (11) comprising an organic silicon compound. The anti-adhesion layer (11) prohibits or reduces the adhesion, caking and blocking of urea dust in the connection-duct. Therefore, the cleaning nozzle (13) can be either omitted or be placed more remote to the air vent opening (8) at ($d_i$), preferably in a vertical section of the connection-duct (10). This before mentioned positioning of the cleaning nozzle or nozzles (13) omits the need to spray water near the air vent opening (8). Simultaneously, the amount of water and urea dust clusters dropping back into the fluid-bed (17) is significantly reduced, leading to longer/extended operation cycles and better product quality. In addition the cleaning nozzle (13) can be used to quench the hot air stream originating from the granulator space (1) of the fluid-bed granulator (14). Therefore the temperature of the before mentioned hot air stream can be reduced before entering the scrubbing unit (9), omitting or reducing additional quenching steps.

REFERENCE SIGNS (1) granulator space
(2) perforated plate
(3) spray nozzles
(4) supply lines for atomization air
(5) supply lines for a liquid melt
(6) granulation seeds inlet
(7) granulator outlet opening
(8) air vent opening
(9) scrubber unit
(10) connection-duct
(11) anti-adhesion layer
(12) inner surface of the connection-duct
(13) cleaning nozzle
(14) fluid-bed granulator
(15) fluidization air inlet
(16) granular particles
(17) fluid-bed
(22) separating walls
(23) scrubber opening
($d_0$) relative in-duct distance at the air vent opening
($d_i$) relative in-duct distance at a given point, e.g. position of the cleaning nozzle
($d_{100}$) relative in-duct distance at the scrubber opening
(I) flow direction of the granules
(II) flow direction of fluidization air

What is claimed is:

1. A fluid-bed granulator system comprising:
a fluid-bed granulator;
a scrubber unit; and
a connection-duct between an air vent opening of the fluid-bed granulator and the scrubber unit, wherein an inner surface of the connection-duct is at least partially coated with an anti-adhesion layer, wherein a cleaning nozzle is disposed inside the connection-duct, wherein the cleaning nozzle is disposed in a vertical section of the connection-duct.

2. The fluid-bed granulator system of claim 1 comprising:
a granulator space inside the fluid-bed granulator;
a perforated plate disposed inside the granulator space;
spray nozzles disposed in, on, or beside the perforated plate;
a fluidization air inlet;
supply lines for atomization air connected to the spray nozzles;
supply lines for a liquid melt connected to the spray nozzles;
a granulation seeds inlet;
a granulator outlet opening; and
an air vent opening.

3. The fluid-bed granulator system of claim 1 wherein the anti-adhesion layer comprises an organic silicon compound.

4. The fluid-bed granulator system of claim 1 wherein at least 10% of the inner surface of the connection-duct is coated with the anti-adhesion layer.

5. The fluid-bed granulator system of claim 1 wherein the cleaning nozzle is disposed at a location within 2% to 90% of an in-duct distance between an air vent opening and the scrubber unit inside the connection-duct.

6. The fluid-bed granulator system of claim 1 wherein the anti-adhesion layer comprises an organic silicon compound that is comprised of polyalkylsilicone compounds, polyarylsilicone compounds, polyallylsilicone compounds, and/or mixtures or derivatives of alkyl-, aryl- and allyl silicone compounds.

7. The fluid-bed granulator system of claim 6 wherein the organic silicon compound is comprised of polyalkylsiloxane, polymethylsiloxane, polydimethylsiloxane, polymethylphenylsiloxane, perfluoroalkylsilane, perfluoroalkylsiloxane, and/or mixtures or derivatives thereof.

8. The fluid-bed granulator system of claim 7 wherein the organic compound comprises polymethylsiloxane.

9. The fluid-bed granulator system of claim 1 wherein the anti-adhesion layer has a thickness of 0.5 µm to 1000 µm.

10. The fluid-bed granulator system of claim 1 wherein the perforated plate is at least partially coated with the anti-adhesion layer.

11. A urea granulation plant, comprising:
a product sieve or crusher configured to feed a granulation seeds inlet;
a fluid-bed granulator system comprising:
a fluid-bed granulator;
a scrubber unit; and
a connection-duct between an air vent opening of the fluid-bed granulator and the scrubber unit, wherein an inner surface of the connection-duct is at least partially coated with an anti-adhesion layer, wherein a cleaning nozzle is disposed inside a vertical section of the connection-duct.

12. A method comprising:
utilizing a fluid-bed granulator system comprising:
a fluid-bed granulator;
a scrubber unit; and
a connection-duct between an air vent opening of the fluid-bed granulator and the scrubber unit, wherein an inner surface of the connection-duct is at least partially coated with an anti-adhesion layer, wherein a cleaning nozzle is disposed inside a vertical section of the connection-duct to produce fertilizer granules containing ammonia compounds, nitrates, phosphates, urea, elemental sulfur, ammonia sulfate, urea-ammonia sulfate (UAS), and/or mixtures thereof, including cooling of a dust and gas streams via the cleaning nozzle inside the connection-duct.

* * * * *